J. W. & A. RUGER. 2 Sheets—Sheet 1.
Cracker-Machine.
No. 211,057. Patented Dec. 17, 1878.
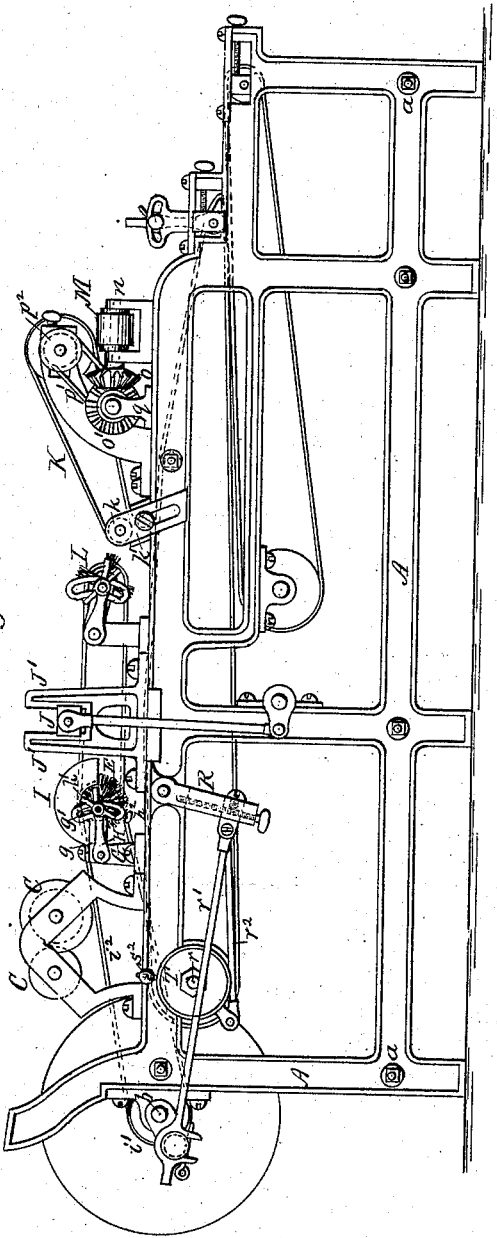
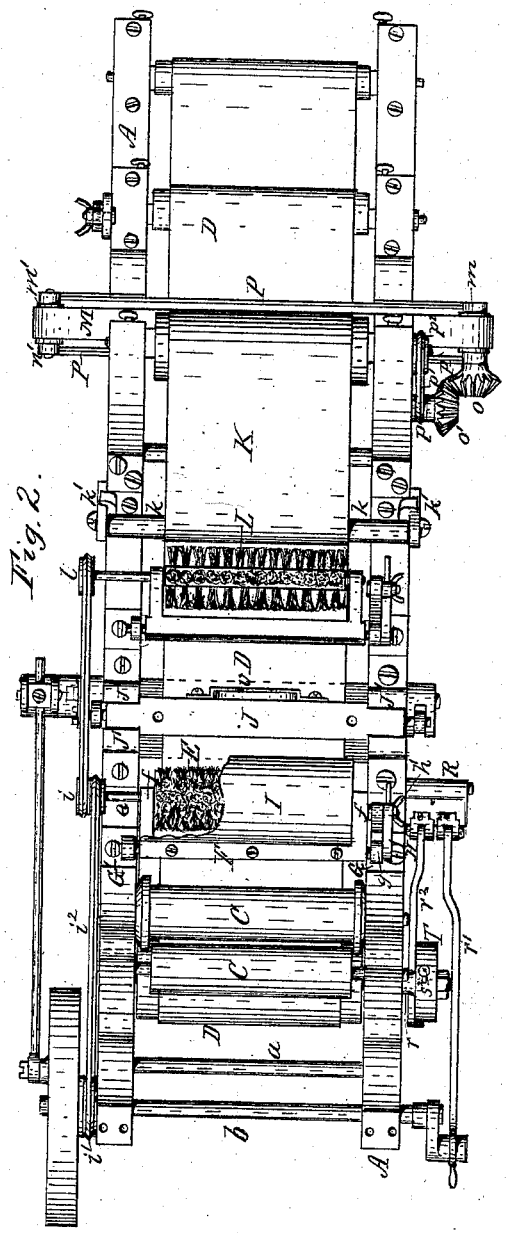
Witnesses:
Chas. J. Buchheit
Henry Brown
J. W. Ruger
Augustus Ruger, Inventors.
By Wilhelm & Bonner
Attorneys.

J. W. & A. RUGER.
Cracker-Machine.

No. 211,057.   Patented Dec. 17, 1878.

Witnesses:
Chas. J. Buchheit
Henry Brown

J. W. Ruger
Augustus Ruger, Inventors
By Wilhelm & Bonner
Attorneys.

UNITED STATES PATENT OFFICE.

JAMES W. RUGER AND AUGUSTUS RUGER, OF BUFFALO, NEW YORK.

IMPROVEMENT IN CRACKER-MACHINES.

Specification forming part of Letters Patent No. 211,057, dated December 17, 1878; application filed July 13, 1878.

*To all whom it may concern:*

Be it known that we, JAMES W. RUGER and AUGUSTUS RUGER, both of the city of Buffalo, in the county of Erie and State of New York, have invented new and useful Improvements in Cracker-Machines, of which the following is a specification, reference being had to the accompanying drawings.

This invention relates more especially to that class of cracker-machines in which the sheet of dough, after being supplied with the necessary flour, is passed by means of an endless apron underneath a rotary brush, whereby the sheet of dough is dressed; then presented to the cutters, which cut the sheet of dough up into crackers; then carried forward to the scrap-apron, which separates the scrap from the crackers, the latter passing underneath the scrap-apron to the pan-apron.

Our invention has reference to certain improvements in this class of machines, whereby the same are better enabled to perform their function; and it consists, first, in arranging the rotary dough-dressing brush in a pivoted frame, so that it can be quickly raised from the dough when required, and secured in any desired position; also, in the particular construction of the parts supporting the brush, as will be hereinafter more fully set forth; also, in arranging a rotary brush at the foot of the scrap-apron for separating the crackers from the scrap; also, in combining with the scrap-apron a transverse apron in such manner that the scrap is received by the transverse apron and carried to one side of the machine without reversing the course of the scrap in passing from the main apron to the scrap-apron; also, of a device for throwing the feed mechanism of the main apron in and out of gear, so that the movement of this apron can be stopped whenever it is so desired.

Figure 3:
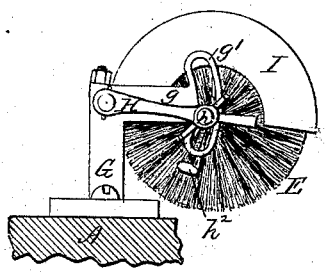
Figure 4:
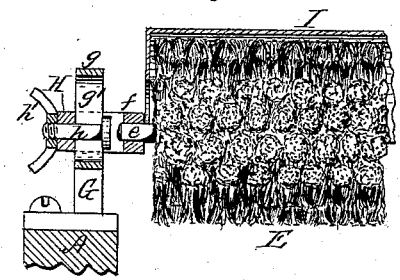
Figure 5:
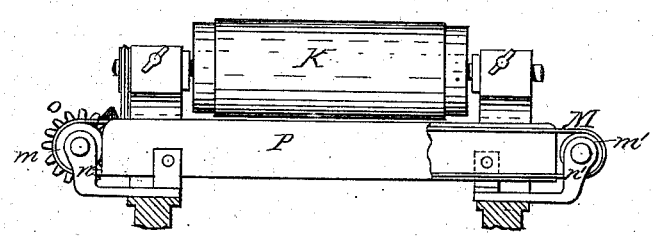
Figure 6:
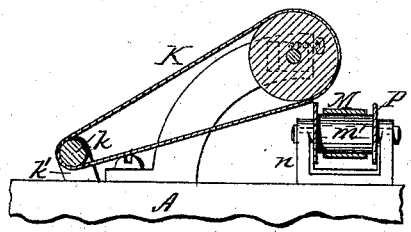
Figure 9:
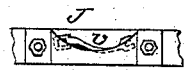
Figure 7:
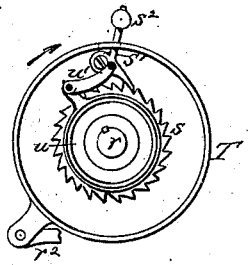
Figure 8:
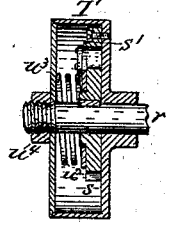

In the accompanying drawings, consisting of two sheets, Figure 1 is a side elevation of a machine provided with our improvements. Fig. 2 is a top-plan view thereof. Fig. 3 is a side elevation of the dough-dressing brush. Fig. 4 is a fragmentary section thereof. Fig. 5 is a rear view of the scrap-aprons. Fig. 6 is a longitudinal section thereof. Fig. 7 is a side elevation of the feed-ratchet with the cover removed. Fig. 8 is a vertical section thereof. Fig. 9 is a fragmentary front view of the cutter cross-head.

Like letters of reference designate like parts in each of the figures.

A A represent the side frames of the machine, connected by cross-stays $a$, in the usual manner. $b$ is the driving-shaft, to which motion is imparted in any ordinary and well-known manner. C C are the feed-rollers, from which the sheet of dough passes to the endless feed-apron D. E is the rotary brush for dressing the sheet of dough preparatory to cutting it up into crackers.

The shaft $e$ of the brush E turns in bearings $f$, attached to a cross-bar, F, which is pivoted in standards G G', secured to the side frames, A, so that the brush E overhangs and is held down against the sheet of dough by its own weight. The standard G is provided with an arm, $g$, having a curved slot, $g'$, made concentric with the journaled cross-bar F.

H is an arm secured to the end of that journal of the cross-bar F which projects through the standard G.

The arm H is provided with a bolt, $h$, passing through the curved slot $g'$, and having a head on one side of the slot $g'$, and a thumb-nut, $h^1$, on the face of the arm H, so that upon loosening the thumb-nut $h^1$ the brush E can be raised or lowered, at the will of the operator, in an arc concentric with axis of motion, maintaining the proper relation of the two belt-pulleys, and secured at any desired elevation by tightening the thumb-nut.

$h^2$ is a set-screw arranged in the lower portion of the slot $g'$, so as to bear against the bolt $h$, for fixing the point to which the brush E can descend when the thumb-nut $h^1$ is released. $i$ is a double pulley mounted on the end of the brush-shaft, and connected with a pulley, $i^1$, on the driving-shaft by means of an endless belt, $i^2$. I is a semi-cylindrical cover secured to the cross-bar F, and surrounding the upper portion of the brush E.

The brush E revolves in a direction contrary to the movement of the sheet of dough, and is therefore liable to push back and double up the end of the sheet of dough when first presented to the brush.

In machines in which the brush is supported in stationary bearings, the movement of the brush has to be stopped in order to pass the end of the sheet of dough under the brush. This inconvenience is entirely avoided in our improved machine, in which the brush is quickly raised, so as to permit the end of the sheet of dough to pass underneath the brush, when the brush is lowered and readily held at any desired height.

J is the cross-head of the cutters, actuated in the usual manner; and J', the vertical guides between which the cross-head moves. K is the inclined scrap-apron, arranged above the rear portion of the feed-apron, so as to rise backwardly. $k$ is the foot-roller of the scrap-apron, arranged near the upper side of the feed-apron, and supported in adjustable bearings $k'$, so that its distance from the feed-apron may be increased or lessened, as may be necessary. When cutters are used which leave continuous longitudinal bands of scrap between the rows of crackers, the foot of the scrap-apron can be arranged closely to the feed-apron, as the longitudinal bands of scrap will run easily upon the scrap-apron. When the cutters are arranged closely, side by side, so as to leave no longitudinal bands of scrap, except at the margins, and transverse bands of scrap running from one marginal band to the other, these transverse bands of scrap are apt to sag at the center when their ends are raised upon the scrap-apron by the marginal bands, and will therefore be carried under the scrap-apron by the feed-apron, whereby the scrap is broken up and its delivery impeded. For this reason it has not been customary to employ the scrap-apron when transverse bands of scrap were produced, and to have the scrap taken from the feed-apron by an attendant. In our improved machine the foot of the scrap-apron can be raised by the adjustable bearings $k'$ to such a height that the transverse bands of scrap will not be drawn underneath the scrap-apron, but will run upon the latter as easily as longitudinal bands, thereby insuring a uniform and automatic discharge of the scrap in all cases. The bearings $k'$ are secured to the side frames, A, by bolts passing through elongated holes or slots to render the bearings adjustable.

L is a rotary brush arranged in front of the foot of the scrap-apron K, for separating the crackers from the scrap. The brush L is mounted in substantially the same manner as the brush E, so as to be held down by its own weight, and at the same time permit the brush to be quickly raised and lowered, and held at any desired elevation, as has been fully described with reference to the brush E. The brush L is driven by an endless belt running over a pulley, $l$, on the brush-shaft, and the double pulley $i$ on the shaft of the brush E. The brush L exerts a constant pressure upon the bands of scrap ascending from the feed-apron to the scrap-apron, and detaches any crackers which may adhere to the scrap, and lays such crackers properly upon the feed-apron.

M is an endless apron, arranged transversely under the head-roller of the scrap-apron K, so as to receive the scrap discharged from the latter and carry it to one side of the machine. The endless apron M runs over the pulleys or rollers $m$ $m'$, supported in bearings $n$ $n'$, secured to the side frames, A. The roller $m$ is provided with a bevel-wheel, $o$, meshing with a bevel-wheel, $o'$, which carries a pulley, $p$, connected by means of an endless belt, $p^1$, with a pulley, $p^2$, secured to the shaft of the head-roller of the scrap-apron. The bevel-wheel $o'$ turns on a stud which is attached to a bracket, $q$, secured to one of the side frames, A.

P P are two vertical side plates, extending across the machine on each side of the transverse apron M, for confining the scrap to the upper side of said apron. The side plates, P P, are secured with their ends to the brackets $n$ $n'$. The bands of scrap discharged over the head-pulley of the scrap-apron K are collected by the transverse apron M and carried to one side of the machine, where they are deposited in a suitable receptacle.

$r$ represents the driving-shaft of the feed-apron D, to which an intermittent motion is imparted from the main driving-shaft $b$ by means of an interposed oscillating arm, R, connected with the main driving-shaft by a rod, $r^1$, and with the ratchet mechanism of the feed-apron by a rod, $r^2$. This ratchet mechanism is composed of a ratchet-wheel, $s$, secured to the driving-shaft $r$ of the feed-apron, and a surrounding circular case, T, mounted loosely on the shaft $r$ and connected to the rod $r^2$.

$s^1$ is the actuating-pawl, pivoted to the shell T, and provided with a thumb-piece, $s^2$, projecting through the rim of the shell T in convenient reach of the operator. $u$ is a collar fitting loosely upon the hub of the ratchet-wheel $s$, and $u^1$ a link connecting the pawl $s^1$ with the collar $u$ in such manner that when the collar $u$ is held stationary the pawl $s^1$ will be thrown in engagement with the teeth of the ratchet-wheel, or be withdrawn therefrom by turning the shell T forward (in the direction indicated by the arrow in Fig. 7) or backward, respectively. $u^2$ is a spiral spring, which is held against the collar $u$ by means of a cover, $u^3$, and screw-nut $u^4$, applied to the threaded end of the driving-shaft $r$.

It sometimes occurs that by reason of an improper consistency of the dough the motion imparted to the sheet of dough by the feed-rollers C C is slower than the motion of the feed-apron, when it becomes desirable to stop the motion of the feed-apron for a sufficient length of time to compensate for its excess of speed. This is readily accomplished in our improved machine by pressing the thumb-piece $s^2$ outward, whereby the pawl $s^1$ is disengaged from the ratchet-wheel and the feed motion arrested.

$v$ represents a pocket or receptacle secured to or formed on the side of the cross-head J, for receiving the wrench which is used in applying and removing the screw-nuts in exchanging the cutters. This wrench is often mislaid, causing great delay and annoyance, which is entirely obviated by the use of the pocket v.

We claim as our invention—

1. In a cracker-machine, the combination, with the rotary brush E, of the pivoted frame F, arm H, and a fastening device applied thereto, for holding the pivoted frame at any desired elevation, substantially as set forth.

2. The combination, with the rotary brush E, supported in the pivoted frame F, and arm H, secured thereto, of the standards G G', one of which is provided with curved slot $g'$, and a fastening device for securing the arm H to the slotted standard, substantially as set forth.

3. The combination, with the rotary brush E, of the pivoted frame F, arm H, slotted standard G, slotted arm $g$ $g'$, fastening-bolt $h$, and set-screw $h^2$, substantially as set forth.

4. The combination, with the feed-apron D and scrap-apron K, of the rotary brush L, arranged at the foot of the scrap-apron for separating the crackers from the scrap, substantially as set forth.

5. The combination, with the feed-apron D and scrap-apron K, of the transverse apron M, having actuating mechanism, and arranged below the head of the scrap-apron on the rear side thereof, for receiving the scrap and conveying it to one side of the machine without reversing the motion of the scrap, substantially as set forth.

6. The combination, with the side frames, A A, and feed-apron D, of the inclined scrap-apron K and foot-roller $k$, supported in adjustable bearings $k'$, so that the roller $k$ can be adjusted toward and from the feed-apron D, substantially as set forth.

7. The combination, with the ratchet-wheel $s$ and circular case T, of the pawl $s^1$, provided with thumb-piece $s^2$, projecting through the case T, substantially as set forth.

J. W. RUGER.
AUGUSTUS RUGER.

Witnesses:
JNO. J. BONNER,
S. WELCH.